United States Patent
Baeumler et al.

(10) Patent No.: US 12,180,982 B2
(45) Date of Patent: Dec. 31, 2024

(54) SUPPLY DEVICE FOR AN APPARATUS, APPARATUS, AND MOTOR VEHICLE

(71) Applicant: Bayerische Motoren Werke Aktiengesellschaft, Munich (DE)

(72) Inventors: Richard Baeumler, Munich (DE); Nikola Brk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/277,236

(22) PCT Filed: Mar. 1, 2022

(86) PCT No.: PCT/EP2022/055052
§ 371 (c)(1),
(2) Date: Aug. 15, 2023

(87) PCT Pub. No.: WO2022/207211
PCT Pub. Date: Oct. 6, 2022

(65) Prior Publication Data
US 2024/0117823 A1    Apr. 11, 2024

(30) Foreign Application Priority Data
Mar. 30, 2021   (DE) .................. 10 2021 107 996.9

(51) Int. Cl.
*F16H 61/00*  (2006.01)
*F15B 13/04*  (2006.01)
(Continued)

(52) U.S. Cl.
CPC .......... *F15B 13/04* (2013.01); *F16H 57/0412* (2013.01); *F16H 57/0435* (2013.01);
(Continued)

(58) Field of Classification Search
CPC ............ F16H 61/0021; F16H 61/0025; F16H 2061/0037; F15B 11/16; F15B 11/20; F15B 11/205
See application file for complete search history.

(56) References Cited

U.S. PATENT DOCUMENTS

| 9,835,243 B2 * | 12/2017 | Filippin .............. F16H 57/0446 |
| 2008/0214353 A1 | 9/2008 | Willeke et al. |
| 2014/0290767 A1 | 10/2014 | Jo et al. |

FOREIGN PATENT DOCUMENTS

| DE | 1 921 166 B1 | 10/1970 |
| DE | 103 18 152 A1 | 11/2004 |

(Continued)

OTHER PUBLICATIONS

International Search Report (PCT/ISA/210) issued in PCT Application No. PCT/EP2022/055052 dated May 10, 2022 with English translation (4 pages).

(Continued)

*Primary Examiner* — Michael Leslie
(74) *Attorney, Agent, or Firm* — Crowell & Moring LLP

(57) ABSTRACT

A supply device for an apparatus includes: a first flow path through which a fluid can flow; a first consumer which is arranged in the first flow path and can be supplied with the fluid via the first flow path; a pump which is arranged in the first flow path and by which the fluid can be pumped out of a reservoir through the first flow path; a throttle which is arranged in the first flow path upstream of the first consumer and downstream of the pump; a second flow path through which the fluid can flow and which is fluidically connected to the first flow path at a first connection point located in the first flow path upstream of the throttle and downstream of the pump; and a second consumer which is arranged in the second flow path and can be supplied with the fluid via the second flow path.

11 Claims, 1 Drawing Sheet

(51) Int. Cl.
   *F16H 57/04*     (2010.01)
   *F16H 61/30*     (2006.01)

(52) U.S. Cl.
   CPC .. *F16H 61/0025* (2013.01); *F16H 2061/0037* (2013.01); *F16H 2061/0046* (2013.01); *F16H 61/30* (2013.01)

(56)     References Cited

FOREIGN PATENT DOCUMENTS

DE    10 2004 008 611 A1    9/2005
   DE    10 2008 007 054 A1    8/2008
   DE    10 2012 200 173 A1    7/2013
   DE    10 2013 112 689 A1    10/2014

OTHER PUBLICATIONS

German-language Written Opinion (PCT/ISA/237) issued in PCT Application No. PCT/EP2022/055052 dated May 10, 2022 with English translation (12 pages).
German-language Search Report issued in German Application No. 10 2021 107 996.9 dated Oct. 5, 2021 with partial English translation (10 pages).

\* cited by examiner

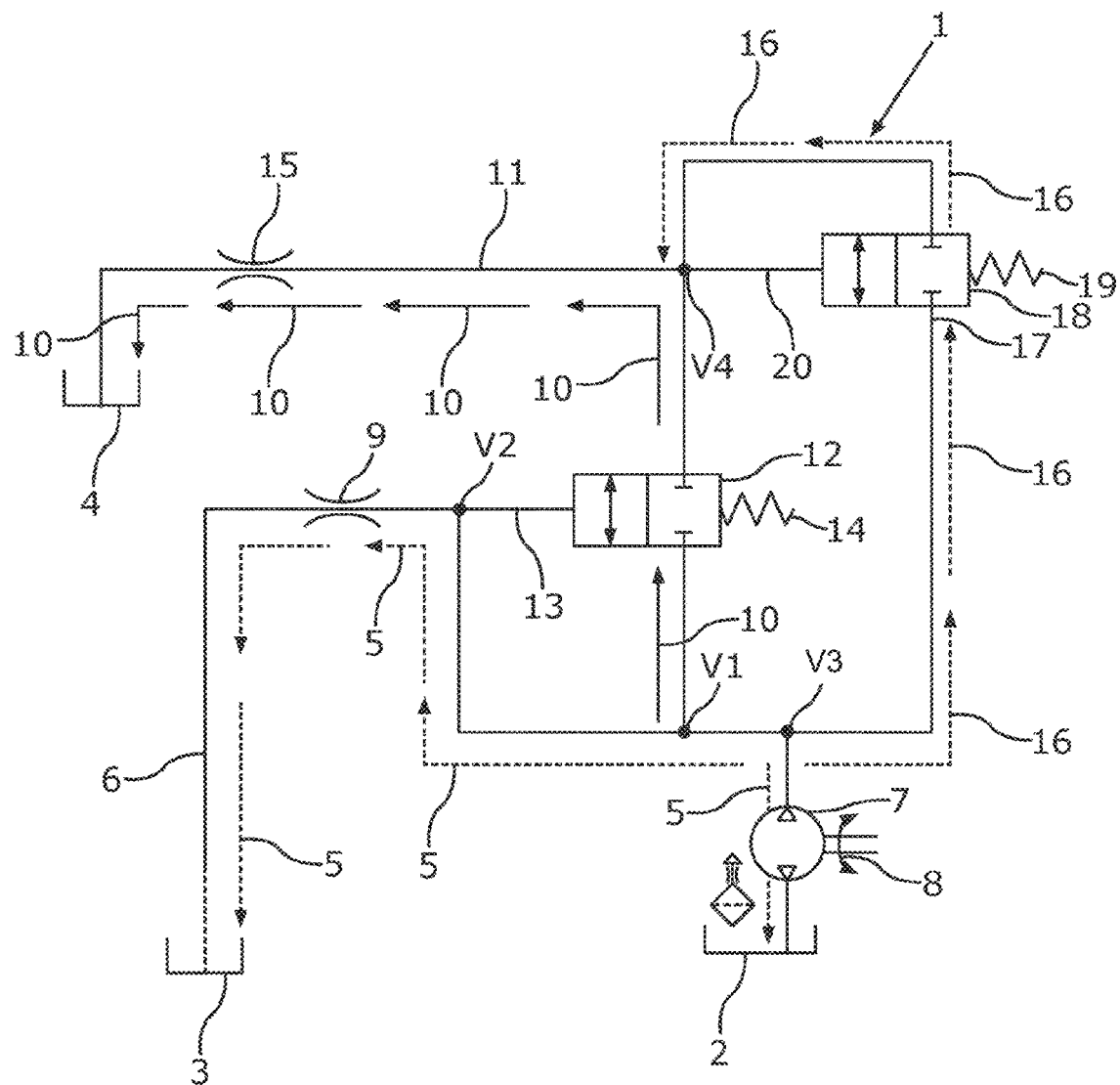

SUPPLY DEVICE FOR AN APPARATUS, APPARATUS, AND MOTOR VEHICLE

BACKGROUND AND SUMMARY

The invention relates to a supply device for an apparatus, in particular of a motor vehicle. Furthermore, the invention relates to an apparatus, in particular for a motor vehicle, with at least one supply device of this type. The invention also applies to a motor vehicle with at least one apparatus of this type.

A hydraulic arrangement for controlling a cone pulley transmission with a variably adjustable transmission ratio of a motor vehicle can be gathered as known from DE 10 2008 007 054 A1. Moreover, DE 1 921 166 B1 discloses a valve with self-locking.

It is an object of the present invention to provide a supply device for an apparatus, in particular of a motor vehicle, an apparatus with at least one supply device of this type, and a motor vehicle with at least one apparatus of this type, with the result that at least two consumers can particularly advantageously be supplied with a fluid.

According to the invention, this object is achieved by way of a supply device, by way of an apparatus, and by way of a motor vehicle, in accordance with the independent claims. Advantageous refinements of the invention are the subject matter of the dependent claims.

A first aspect of the invention relates to a supply device for an apparatus, in particular of a motor vehicle. The invention is not restricted to motor vehicles, but is explained in the following text on the basis of a motor vehicle, in particular. It is therefore provided, for example, that the motor vehicle which is configured, for example, as a car, in particular as a passenger car, has the apparatus and therefore the supply device in its completely produced state. The apparatus can be a drive train or a component of a drive train. For example, the apparatus is a drive engine, in particular of an internal combustion engine, or the apparatus is a transmission which, for example, has at least two gear stages which can be shifted and therefore can be engaged and disengaged and can differ from one another with regard to their transmission ratios.

The supply line has a first flow path which can be flowed through by a fluid. The fluid can be a constituent part of the supply device. The fluid is preferably a liquid. The fluid can be, for example, a fuel, in particular a liquid fuel. Furthermore, the fluid can be a lubricant such as an oil, for example. The first flow path is formed, for example, by way of a first line element which can be flowed through by the fluid and, for example, can be a first solid body. The supply device has at least one first consumer which is arranged in the first flow path and can be supplied via the first flow path with the fluid which flows through the first flow path. Therefore, for example, the first consumer can be operated by means of the fluid which flows through the first flow path. As an alternative or in addition, it is conceivable that the first consumer can be lubricated and/or cooled by means of the fluid which flows through the first flow path. The first consumer is also called a first machine element, or is a first machine element.

The supply device has a pump which is arranged in the first flow path and by means of which the fluid can be conveyed from a reservoir such as, for example, a tank or sump through the first flow path. The pump is preferably an electrically operable or electrically drivable pump. Therefore, for example, an electric motor is provided, by means of which the pump can be driven or the pump is driven. By way of driving of the pump, the fluid is conveyed by means of the pump and, in particular, is conveyed through the first flow path as a result. Moreover, the supply device has a throttle which is also called a first throttle. The first throttle is arranged in the first flow path upstream of the first consumer and downstream of the pump. The throttle has a flow cross section which can be flowed through by the fluid and is called a first flow cross section. The first flow cross section is preferably fixed or rigid, that is to say unchangeable. It is also conceivable, however, that the first throttle is an adjustable throttle, the first flow cross section of which is variable, that is to say is adjustable.

Furthermore, the supply device comprises a second flow path which can be flowed through by the fluid and is connected at a first connecting point fluidically to the first flow path and, as a consequence, branches off from the first flow path at the first connecting point. The first connecting point is arranged in the first flow path or in relation to the first flow path upstream of the first throttle and downstream of the pump, with the result that at least part of the fluid which flows through the first flow path can be branched off from the first flow path at the first connecting point and can be introduced into the second flow path, with the result that, for example, the fluid which is introduced in the second flow path can then flow through the second flow path. For example, the second flow path is formed by way of a second line element which can be flowed through by the fluid and is preferably a second solid body.

Moreover, the supply device has at least one second consumer which is arranged in the second flow path and can be supplied via the second flow path with the fluid which flows through the second flow path. Therefore, for example, the second consumer can be operated or actuated by means of the fluid which flows through the second flow path, and/or the second consumer can be lubricated and/or cooled by means of the fluid which flows through the second flow path. The second consumer is also called a second machine element, or is a second machine element. For example, one of the machine elements or one of the consumers can be a clutch of the abovementioned transmission or a shifting element or at least one gearwheel or one gearwheel pair or gear set which comprises at least two gearwheels, or else an electric machine, by means of which, for example, the motor vehicle can be operated electrically, in particular purely electrically. The shifting element can be switched over, in particular can be moved, between at least one coupled state and at least one decoupled state, for example. In the coupled state, two components are coupled to one another in a torque-transmitting manner, for example by means of the shifting element, in particular are connected to one another fixedly for conjoint rotation. In the decoupled state, for example, the components are decoupled from one another, with the result that no torques can be transmitted between components. In particular, the components can be rotated relative to one another in the decoupled state, with the result that, for example in the decoupled state, the shifting element permits a relative rotation between the components.

Furthermore, the supply device comprises a valve element which is arranged in the second flow path downstream of the first connecting point and upstream of the second consumer and is also called a first valve element. The valve element can be moved, in particular can be moved translationally, between a closed position which is also called a first closed position and an open position which is also called a first open position. In the first closed position, the second flow path is shut fluidically by way of the first valve element, with the result that no fluid can flow through the second flow path. In the first open position, however, the first valve element releases the second flow path, with the result that, in the first open position, the fluid can flow through the second flow path. In particular, in the first open position, the pump can convey the fluid through the second flow path and can therefore convey it via the second flow path toward the second consumer. It is conceivable here, in particular, that the first flow path is released and, as a consequence, can be flowed through by the fluid both in the first open position and in the first closed position, with the result that the pump can preferably convey the fluid through the first flow path both in the first closed position and in the first open position, and with the result that the first consumer can be supplied with the fluid by way of the first flow path both in the closed position and in the open position.

Furthermore, the supply device comprises a control line which is connected fluidically to the first flow path at a second connecting point. The second connecting point is arranged in the first flow path upstream of the first throttle and downstream of the first connecting point, with the result that the valve element with the fluid from the first flow path via the control line, in particular when the fluid has conveyed out of the reservoir through the first flow path by means of the pump, the fluid at the second connecting point has a pressure which is also called a first pressure. Since the control line is connected fluidically to the first flow path at the second connecting point, the fluid which has the first pressure can be received in the control line. Therefore, the valve element can be loaded via the control line with the fluid which has the first pressure, that is to say at the first pressure, as a result of which the valve element (first valve element) can be moved out of the closed position into the open position. In the first open position of the first valve element, the fluid can be conveyed out of the reservoir by means of the pump at the same time through the first flow path and through the second flow path, with the result that the consumers can be supplied at the same time with the fluid via the flow paths by means of the pump when the first valve element is situated in the first open position.

The supply device according to the invention makes a particularly simple and needs-oriented supply of the consumers with the fluid possible, without an excessively large number of cost-intensive, weight-intensive and installation space-intensive components such as, for example, valves being required to this end. In particular, the supply device makes it possible, in relation to the consumers, for exclusively the first consumer or both consumers at the same time to selectively be supplied with the fluid, in particular in the following way: in a first operating state of the pump, for example, a first volumetric flow of the fluid is conveyed through the first flow path by means of the pump, with the result that the fluid flows through the first flow path with the first volumetric flow. In order that the pump conveys the fluid with the first volumetric flow, the pump which is configured, in particular, as an electrically operable pump is supplied with a first electrical current, for example, and is therefore operated by means of the first electrical current. The first volumetric flow is greater than zero, but so small, for example, that the first volumetric flow or the pressure of the fluid which results from the first connecting point and prevails at the second connecting point is not sufficient to move the first valve element out of the closed position into the open position, with the result that, in the first operating state, the valve element is situated, in particular automatically, in the first closed position. For example, the first valve element is assigned a spring element which is, in particular, mechanical and can be loaded or is loaded by way of movement of the first valve element out of the first closed position into the first open position and, as a result, provides a spring force which acts at least indirectly, in particular directly, on the first valve element, with the result that the first valve element can be moved by means of the spring force out of the first open position into the first closed position. For example, the spring element also provides the spring force or a further spring force in the first closed position, as a result of which the first valve element is held in the first closed position. The first volumetric flow or the first pressure which results therefrom is not sufficient here to move the first valve element out of the first closed position into the first open position counter to the spring force which is provided by the spring element.

As a result of an increase in the volumetric flow of the fluid, the pressure of the fluid prevailing at the first throttle and therefore the first pressure of the fluid prevailing at the second connecting point increase, the first pressure of the fluid prevailing at the second connecting point corresponding, for example, at least substantially to the pressure of the fluid prevailing at the first throttle. It is therefore possible, for example, that the pump is operated in a second operating state. In the second operating state of the pump, a second volumetric flow, in particular greater than the first volumetric flow, of the fluid is conveyed by means of the pump. The second volumetric flow results in a second pressure of the fluid which is greater than the first pressure at the second connecting point, with the result that the first valve element is then loaded via the control line with the fluid which has the second pressure or with the second pressure. The second volumetric flow and the resulting, second pressure are then preferably so great that the valve element is moved out of the first closed position into the first open position, in particular counter to the spring force which is provided by the spring element, with the result that the first valve element releases the second flow path. It is therefore preferably provided that, in the second operating state, the valve element is situated in the first open position, with the result that, in the second operating state, the fluid is conveyed by means of the pump at the same time through the first flow path and at the same time through the second flow path. Therefore, in the second operating state, both consumers are supplied at the same time with the fluid. In contrast, it is provided in the first operating state that, in relation to the flow paths, the fluid is conveyed by means of the pump exclusively through the first flow path, with the result that, in the first operating state, in relation to the consumers exclusively the first consumer is supplied with the fluid. The second operating state or the second volumetric flow can be brought about or realized, for example, by virtue of the fact that the pump is supplied with a second electrical current which is greater than the first electrical current, and is therefore operated by means of the second electrical current. In order, again in relation to the consumers, for exclusively the first consumer to be supplied with the fluid, for example, the volumetric flow is reduced. In other words, for example, a change or a switchover is carried out from the second operating state to the first operating state. Therefore, a change or a switchover can be carried out in a needs-based and simple way between the operating states, with the result that the consumers can be supplied with the fluid in a needs-based manner. It can be seen, in particular, that the second consumer can be switched on and off in a needs-based manner. This is to be understood to mean the following, in particular: in the first operating state, a supply of the second consumer with the fluid does not happen, with the result that the second consumer is switched off in the first operating state. By way of setting or bringing about of the second operating state, that is to say by way of switching over from the first operating state into the second operating state, the second consumer is switched on, with the result that, in the second operating state, both the first consumer and the second consumer are supplied with the fluid. Therefore, the supply device according to the invention makes a simple and efficient distribution of the fluid possible, in particular in a hydraulic circuit. Here, the consumers can be supplied with the fluid in a needs-based manner, without an active activation or actuation of components such as valves, for example, being required to this end. The first valve element can be opened and closed, for example, exclusively and solely by way of setting or varying of the volumetric flow of the fluid conveyed by means of the pump. In other words, a movement of the first valve element between the first open position and the first closed position can be brought about by way of varying of the volumetric flow of the fluid, without it being necessary for the first valve element to be actuated actively or electrically. As described above, the volumetric flow of the fluid can be set or varied by means of the pump in such a way that, for example, an electrical current, with which the pump is supplied in order to operate the pump by means of the electrical current, is varied. It can be seen overall that the supply device makes a situational and therefore needs-based supply of the second consumer with the fluid possible. In other words, a needs-based feed of the fluid to the second consumer is possible, with the result that the invention, in particular, is particularly advantageously suitable for a transmission or transmission components, cooling circuits etc.

In order for it to be possible for the second consumer to be supplied with the fluid in a particularly simple and particularly needs-based way, it is provided in the case of one embodiment of the invention that a second throttle is arranged in the second flow path upstream of the second consumer and downstream of the first valve element. The second throttle has a second flow cross section which can be flowed through by the fluid. It is preferably provided that the second flow cross section is fixed or rigid, that is to say is not adjustable. It would fundamentally be conceivable, however, that the second flow cross section is adjustable, in particular electrically. As an alternative or in addition, it would be conceivable that the first flow cross section and the first throttle are adjustable, for example electrically. The two throttles are preferably configured, however, as fixed (that is to say, non-adjustable) throttles, as a result of which the consumers can be supplied with the fluid in a way which is particularly favorable in terms of costs, installation space and weight.

A further embodiment is distinguished by a third flow path which can be flowed through by the fluid. The third flow path is formed, for example, by way of a third line element which is preferably a third solid body. The third flow path is connected at a third connecting point fluidically to the first flow path and/or fluidically to the second flow path. The third flow path is connected at a fourth connecting point fluidically to the second flow path. The third connecting point is arranged in the first flow path or in relation to the first flow path downstream of the pump and, for example, upstream of the first connecting point. As an alternative or in addition, the third connecting point is arranged in the second flow path or in relation to the second flow path upstream of the valve element and preferably downstream of the pump. The fourth connecting point is arranged in the second flow path or in relation to the second flow path downstream of the first valve element and upstream of the second consumer. The third flow path makes a particularly advantageous and needs-based supply, in particular, of the second consumer with the fluid possible.

It has been shown here to be advantageous in order to realize a particularly needs-based supply of the second consumer with the fluid if the fourth connecting point is arranged in the second flow path or in relation to the second flow path upstream of the second throttle.

In the case of a further, particularly advantageous embodiment of the invention, a second valve element is arranged in the third flow path downstream of the third connecting point and upstream of the fourth connecting point, which second valve element can be moved, in particular in a translational manner, between a second closed position and a second open position. In the second closed position, the third fluid path is shut fluidically by way of the second valve element, with the result that no fluid can flow through the third flow path. In the second open position, however, the second valve element releases the third flow path, with the result that the fluid can flow through the third flow path. In particular, in the second open position, the fluid can be conveyed out of the reservoir through the third flow path by means of the pump. The third flow path and the second valve element which is arranged therein make particularly needs-based switching on and switching off of the second consumer possible, without elements which are to be actuated in an active manner being required to this end. As a result, the costs, the installation space requirement and the weight of the supply device can be kept particularly low.

A further embodiment is distinguished by the fact that the supply device has a return line. Via the return line, the second valve element can be loaded with the fluid from the second flow path from a return point which is arranged in the second flow path downstream of the first valve element and upstream of the second consumer, in particular upstream of the second throttle, and can be moved from the second closed position into the second open position as a result.

The first valve element has, for example, a first opening pressure, from which the first valve opens, and as a consequence is moved out of the first closed position into the first open position. If that pressure of the fluid which prevails at the second connecting point is therefore greater than or equal to the first opening pressure, the first valve element which is initially situated in the first closed position is moved out of the first closed position into the first open position. If that pressure of the fluid which prevails at the second connecting point is lower than the first opening pressure, the first valve element remains in the first closed position. The second valve element has, for example, a second opening pressure, from which the second valve element opens, and as a consequence is moved out of the second closed position into the second open position. If, for example, a pressure of the fluid which prevails at the return point is greater than or equal to the second opening pressure, the second valve element which is initially situated in the second closed position is as a consequence moved out of the second closed position into the second open position. If, however, that pressure of the fluid which prevails at the return point is lower than the second opening pressure, the second valve element remains in the second closed position. That pressure of the fluid which prevails at the return point is dependent, for example, on the volumetric flow, brought about by means of the pump, of the fluid which flows through the second flow path or flows at the return point.

For example, the second valve element is assigned a second (in particular, mechanical) spring element which can be loaded or is loaded by way of movement of the second valve element out of the second closed position into the second open position and, as a result, provides a second spring force which acts at least indirectly, in particular directly, on the second valve element. Therefore, for example, the second valve element can be moved by means of the second spring force out of the second open position into the second closed position and, in particular, can be held in the second closed position. If that pressure of the fluid which prevails at the return point is greater than or equal to the opening pressure, a second opening force which results from that pressure of the fluid prevailing at the return point and acts on the valve element is greater than the second spring force, with the result that the second valve element is then moved out of the second closed position into the second open position.

Via the return line, the second valve element can be loaded with at least part of the fluid from the third flow path and, as a result, can be kept in the second open position, as a result of which self-locking of the second valve element can be realized or is realized. For example, the return line is connected at the return point fluidically to the third flow path and to the second flow path, with the result that, for example when the second valve element is still situated in the second closed position, the second valve element can be loaded via the return line with the fluid out of the second flow path from the return point and, as a result, can be moved out of the second closed position into the second open position. While the second valve element is situated in the second open position, the second valve element can be loaded with at least part of the fluid from the third flow path and, as a result, can be held in the second open position. In other words, the return line makes a return of at least part of the fluid out of the third flow path to the second valve element possible, as a result of which the second valve element is held or can be held in the second open position via self-locking. This self-locking of the second valve element can avoid a situation where, for example when fluctuations or oscillations of the first valve element occur and, resulting from this for example, the first valve element at least temporarily reaches its first closed position, the second valve element is undesirably moved by means of the second spring force out of the second open position into the second closed position and a supply of the second consumer with the fluid is interrupted. As a result of the return or as a result of the self-locking, the second valve element can be held in the second open position even in the case of oscillations of fluctuations of this type of the first valve element, with the result that, even when oscillations or fluctuations of the first valve element occur, the first valve element is moved at least temporarily into its first closed position, and the second valve element is then still supplied with the fluid, conveyed by means of the pump, via the third flow path and therefore via the second, open valve element. As a result, a particularly advantageous and reliable supply of the second consumer with the fluid can be ensured in a particularly simple way.

It has been shown to be particularly advantageous here if the return line is connected at the fourth connecting point fluidically to the second flow path and fluidically to the third flow path. In other words, it is preferably provided that the abovementioned return point is the fourth connecting point. As a result, the return and the self-locking can be realized in a particularly simple way, with the result that a needs-based and reliable supply of the second consumer with the fluid can be ensured. The fourth connecting point can therefore coincide with the return point.

A second aspect of the invention relates to an apparatus, in particular for a motor vehicle. The apparatus in accordance with the second aspect of the invention has at least one supply device in accordance with the first aspect of the invention. Advantages and advantageous refinements of the first aspect of the invention are to be considered to be advantages and advantageous refinements of the second aspect of the invention, and vice versa.

It has been shown to be particularly advantageous if the apparatus is a transmission or an electric machine. It is therefore preferably provided that the apparatus is components or locations of the transmission, or the apparatus is components or locations of the electric machine, with the result that a particularly advantageous and needs-based supply with the fluid can be ensured.

A third aspect of the invention relates to a motor vehicle which is preferably configured as a motor car, in particular as a passenger car, which has an apparatus in accordance with the second aspect of the invention. Advantages and advantageous refinements of the first aspect and the second aspect of the invention are to be considered to be advantages and advantageous refinements of the third aspect of the invention, and vice versa.

Further details of the invention result from the following description of one preferred exemplary embodiment with the associated drawing.

BRIEF DESCRIPTION OF THE DRAWING

The single FIG. 1 is a diagrammatic illustration of a supply device according to an embodiment of the invention for an apparatus, in particular a supply device of a motor vehicle.

DETAILED DESCRIPTION OF THE DRAWING

FIG. 1 shows a diagrammatic illustration of a supply device 1 for an apparatus, in particular of a motor vehicle. This means that, in its completely produced state, the apparatus has the supply device 1. Furthermore, it is preferably provided that the motor vehicle which is preferably configured as a motor car, in particular as a passenger automobile, has, in its completely produced state, the apparatus and therefore the supply device 1. The apparatus can be, for example, a transmission or an electric machine of a drive train of the motor vehicle. Here, the motor vehicle can be driven (in particular purely) electrically by means of the electric machine. As an alternative or in addition, the motor vehicle can be capable of being driven by the transmission. The drive train is preferably an electric drive train, by means of which the motor vehicle can be driven (in particular, purely) electrically. The drive train can comprise the transmission and/or the electric machine. The electric machine is preferably a high-voltage component, the electrical voltage of which (in particular, electrical operating or rated voltage) is preferably greater than 50 volts, in particular greater than 60 volts, and very preferably several hundred volts. As a result, particularly great electrical power outputs can be realized for (in particular, purely) electric drives of the motor vehicle.

The supply device 1 has a reservoir 2, in which a fluid can be received or is received. The fluid is preferably a liquid. The fluid can be a fuel, in particular liquid fuel. Furthermore, the fluid can be a lubricant, in particular an oil, by means of which, for example, at least respective part regions of the supply device 1 and therefore the apparatus can be lubricated and/or cooled. The supply device 1 comprises a first consumer 3 and a second consumer 4. The consumers 3 and 4 are also constituent parts of the apparatus, with the result that the consumers 3 and 4 can be, for example, the abovementioned part regions of the apparatus. At least one of the consumers 3 and 4 can be a lubricating location which can be supplied with the fluid and at which the apparatus is to be lubricated and/or to be cooled by means of the fluid. At least one of consumers 3 and 4 can be a shifting element or a clutch which can be actuated by means of the fluid.

The supply device 1 has a first flow path 6 which can be flowed through by the fluid, is illustrated in FIG. 1 by way of dashed arrows 5, and in which the first consumer 3 is arranged. As a result, the first consumer 3 can be supplied with the fluid via the first flow path 6. The supply device 1 comprises, moreover, a pump 7 which is arranged in the first flow path 6. By means of the pump 7, the fluid can be conveyed out of the reservoir 2 and in the process can be conveyed through the first flow path 6 (dashed arrows 5). In the case of the exemplary embodiment which is shown in FIG. 1, the pump 7 is an electrically operable pump. This means that the pump 7 has an electric motor and a conveying element which, as illustrated in FIG. 1 by way of a double arrow 8, can be driven by means of the electric motor and, as a result, can be moved, in particular can be rotated, in particular relative to a pump housing of the pump 7. By way of driving of the conveying element, the fluid is conveyed by means of the conveying element and therefore by means of the pump 7 out of the reservoir 2 and in the process is conveyed, in particular, through the first flow path 6. In order to drive the conveying element by means of the electric motor, the electric motor is supplied with electrical energy or electrical current. This is to be understood to mean, in particular, that the pump 7 is supplied with the electrical current. The pump 7 can convey the fluid with a respective volumetric flow. By way of varying of the electrical current, by means of which the electric motor or the pump 7 is operated, the volumetric flow can be varied, with which the pump 7 conveys the fluid. It can be seen that the pump 7 is arranged in the first flow path 6.

Moreover, the supply device 1 comprises a first throttle 9 which is arranged in the first flow path 6 upstream of the consumer 3 and downstream of the pump 7 which is arranged downstream of the consumer 3. As will be explained in even greater detail in the following text, the consumers 3 and 4 can be supplied with the fluid from the reservoir 2 by means of the pump 7. After the consumers 3 and 4 are supplied with the fluid from the reservoir 2, the fluid can flow from the consumers 3 and 4 back into a further reservoir or else into the reservoir 2, with the result that a circuit which can be flowed through by the fluid is closed.

Moreover, the supply device 1 comprises a second flow path 11 which is illustrated in FIG. 1 by way of solid arrows 10 and can be flowed through by the fluid. The second flow path 11 is connected at a first connecting point V1 fluidically to the first flow path 6. Here, the connecting point V1 is arranged in the first flow path 6, that is to say in relation to the flow path 6 or in relation to the fluid which flows through the flow path 6, downstream of the pump 7 and upstream of the throttle 9. Therefore, at least part of the fluid which flows through the first flow path 6 can be branched off from the first flow path 6 at the connecting point V1 and can be introduced into the second flow path 11, whereupon, for example, the fluid can flow through the second flow path 11. Once again in other words, the flow path 11 branches off from the flow path 6 at the connecting point V1. Therefore, for example, the flow path 11 is connected in terms of flow parallel to a part of the flow path 6, the part of which extends, for example, from the connecting point V1 to the consumer 3. It can be seen from FIG. 1 that the second consumer 4 which is a constituent part of the supply device 1 and in the process also the apparatus is arranged in the second flow path 11, with the result that the second consumer 4 can be supplied via the second flow path 11 with the fluid which flows through the second flow path 11.

Furthermore, the supply device 1 comprises a first valve element 12 which is arranged in the second flow path 11 downstream of the first connecting point V1 and upstream of the second consumer 4. The valve element 12 can be moved between a first closed position (shown in FIG. 1) and a first open position. In the first closed position, the flow path 11 is shut fluidically by way of the valve element 12. In the first open position, however, the valve element 12 releases the flow path 11. Moreover, the supply device 1 comprises a control line 13 which is connected at a second connecting point V2 fluidically to the first flow path 6. The second connecting point V2 is arranged in the flow path 6, that is to say in relation to the flow path 6 or in relation to the fluid which flows through the flow path 6, upstream of the throttle 9 and downstream of the connecting point V1. Via the control line 13, the first valve element 12 can be loaded with the fluid from the first fluid path 6 and, as a result, can be moved out of the first closed position into the first open position, in which the fluid can be conveyed by means of the pump 7 out of the reservoir 2 at the same time through the first flow path 6 and through the second flow path 11. It can be seen from FIG. 1 that the valve element 12 is assigned a first (in particular, mechanical) spring element 14. When the valve element 12 is moved out of the first closed position into the first open position, the spring element 14 is loaded, as a result of which the spring element 14 provides a first spring force. In the first open position, the first spring force acts at least indirectly, in particular directly, on the first valve element 12, with the result that the first valve element 12 can be moved by means of the first spring force out of the first open position into the first closed position. The spring element 14 preferably also provides its first spring force in the first closed position, with the result that the valve element 12 is also held in the first closed position by means of the first spring force. In a manner which is dependent on the volumetric flow, with which the fluid is conveyed through the first flow path 6 by means of the pump 7, the fluid has, at the connecting point V2, a pressure which is also called a first pressure and can therefore be varied or is varied by way of variation of the volumetric flow of the fluid which flows through the flow path 6. Via the control line 13, the valve element 12 can be loaded with the fluid which has the first pressure, that is to say can be loaded with the first pressure. Here, the first valve element 12 is at a first opening pressure, from which the valve element 12 is opened, that is to say is moved out of the first closed position into the first open position. If the first pressure of the fluid is therefore greater than or equal to the first opening pressure, the valve element 12 which is initially situated in the first closed position is moved out of the first closed position into the first open position. If the first pressure is lower than the first opening pressure, the valve element 12 remains in the first closed position.

Moreover, the supply device 1 comprises a second throttle 15 which is arranged in the flow path 11 upstream of the consumer 4 and downstream of the valve element 12. The throttles 9 and 15 are preferably non-adjustable (that is to say, rigid) throttles, the respective flow cross sections of which, which can be flowed through by the fluid, are rigid, that is to say are non-adjustable. It would be conceivable, however, that the throttle 9 and/or the throttle 15 are/is an adjustable throttle, the flow cross section of which, which can be flowed through by the fluid, are/is adjustable, that is to say, in particular, are/is electrically variable.

Furthermore, the supply device 1 has a third flow path 17 which can be flowed through by the fluid and is illustrated in FIG. 1 by way of dotted arrows 16. The third flow path 17 is connected at a third connecting point V3 fluidically to the first flow path 6. Moreover, the flow path 17 is connected at a fourth connecting point V4 fluidically to the second flow path 11. The third connecting point V3 is arranged in the flow path 6 downstream of the pump 7 and in the process preferably upstream of the connecting point V1. As an alternative or in addition, the connecting point V3 can be arranged in the second flow path 11 and in the process upstream of the valve element 12 and preferably downstream of the pump 7. The fourth connecting point V4 is arranged in the second flow path 11, that is to say in relation to the second flow path 11 or in relation to the fluid which flows through the second flow path 11, downstream of the valve element 12 and upstream of the consumer 4, in particular upstream of the throttle 15. Therefore, for example at the connecting point V3, at least part of the fluid which flows through the flow path 6 can be branched off from the flow path 6 and introduced into the flow path 17 and, thereupon, can flow through the flow path 17, in particular. At the connecting point V4, for example, the fluid which flows through the flow path 17 can flow out of the flow path 17 and can flow into the flow path 11 and, as a consequence, can flow through a second part of the flow path 11, the second part of which extends, for example, from the connecting point V4 as far as the consumer 4. Therefore, the fluid which flows through the flow path 17 can flow, for example, from the connecting point V4 via the second part of the flow path 11 to the consumer 4.

A second valve element 18 which can be moved between a second closed position (shown in FIG. 1) and a second open position is arranged in the third flow path 17 downstream of the third connecting point V3 and upstream of the fourth connecting point V4. In the second closed position, the third flow path 17 is shut fluidically by way of the valve element 18. In the second open position, however, the valve element 18 releases the third flow path 17.

A first opening force which acts on the valve element 12 and, in particular, is opposed to the first spring force results from the first pressure of the fluid which prevails at the connecting point V2. If the first pressure of the fluid which prevails at the connecting point V2 is greater than or equal to the first opening pressure, the first opening force is greater than the first spring force, with the result that the valve element 12 which is initially situated in the first closed position then opens counter to the first spring force and, as a consequence, is moved out of the first closed position into the first open position. If the first pressure is lower than the first opening pressure or the first pressure drops below the first opening pressure, the first opening force is lower than the first spring force or the first opening force drops below the first spring force, with the result that the valve element 12 which is initially situated in the first open position is then moved into the first closed position by means of the first spring force. This applies correspondingly to the valve element 18.

The valve element 18 is assigned a second (in particular, mechanical) spring element 19. The second spring element 19 is loaded by way of movement of the valve element 18 out of the second closed position into the second open position, as a result of which the spring element 19 provides a second spring force. The spring element 19 also preferably provides the second spring force in the second closed position, with the result that the second valve element 18 can be held or is held in the second closed position by means of the second spring force. By means of the second spring force, the second valve element 18 can be moved out of the second open position into the second closed position. Here, the second valve element 18 has a second opening pressure, from which the second valve element 18 is opened, in particular, counter to the second spring force and, as a consequence, is moved out of the second closed position into the second open position. This will be explained in even greater detail in the following text. In the second open position, the fluid can be conveyed by means of the pump 7 out of the reservoir 2 through the third flow path 17. If, for example, the two valve elements 12 and 18 are situated in the open positions, the fluid is conveyed by means of the pump 7, for example, at the same time through the first flow path 6, through the second flow path 11 and through the third flow path 17, with the result that the consumer 3 is supplied with the fluid via the flow path 6, and with the result that the consumer 4 is supplied with the fluid via the flow paths 11 and 17. Here, for example, the flow path 17 is connected in flow terms parallel to a third part of the flow path 11, the third part of which extends from the connecting point V1 as far as the connecting point V4.

Here, the supply device 1 has a return line 20 which is connected at the connecting point V4 fluidically to the flow path 11 and fluidically to the flow path 17. The connecting point V4 is therefore a return point, at which the return line 20 is connected fluidically to the flow paths 11 and 17. At the connecting point V4, for example, the fluid has a second pressure, in particular when the valve element 12 is open, while the valve element 18 is closed. Furthermore, it is conceivable that the fluid has a or the second pressure at the connecting point V4 when the valve elements 12 and 18 are open at the same time. In particular when it is initially closed, that is to say when it is initially situated in the second closed position, the valve element 18 can be loaded via the return line 20 with the fluid out of the second flow path 11 from the return point (V4), with the result that the valve element 18 can be loaded via the return line 20 with the fluid which has the second pressure, that is to say can be loaded with the second pressure. The second pressure can be dependent, for example, on the volumetric flow, brought about by means of the pump 7, of the fluid which flows at the return point (connecting point V4) and in the process flows through, for example, the flow path 11 and/or the flow path 17.

The second valve element 18 has a second opening pressure, from which the second valve element 18 can be moved or is moved out of the second closed position into the second open position. If the second pressure is lower than the second opening pressure, with the result that, for example, a second opening force which results from the second pressure and acts at least indirectly, in particular directly, on the valve element and is opposed to the second spring force, for example, is lower than the second spring force, the valve element 18 is and remains closed and, as a consequence, in its second closed position. In other words, if the volumetric flow of the liquid is so low at the return point (connecting point V4) that the pressure which prevails at the return point, the second pressure of the fluid, is lower than the second opening pressure, the valve element 18 remains in its second closed position. If, however, the second pressure of the fluid is greater than or equal to the second opening pressure, with the result that the second opening force which results from the second pressure is greater than the second spring force, the valve element 18 which is initially situated in the second closed position is opened and, as a consequence, is moved out of the second closed position into the first open position. As a consequence, the valve element 18 releases the flow path 17, with the result that the fluid can flow through the flow path 17. When, in particular, the valve element 18 is situated in the second open position, the second valve element 18 can be loaded via the return line 20 with at least part of the fluid from the third flow path 17 and, as a result, can be held in the second open position. Therefore, a return of the fluid from the flow path 17 to the valve element 18 and therefore self-locking of the valve element 18 can be realized or are realized via the return line 20. This is advantageous, in particular, for the following reasons:

For example, the valve elements 12 and 18 are initially situated in their open positions, with the result that the two consumers 3 and 4 are supplied at the same time with the fluid. If, for example, fluctuations or oscillations of the valve element 12 which result, for example, from pressure fluctuations in the flow path 6 then occur which are of such a nature that the valve element 12 which is initially open and, as a consequence, is initially situated in the first open position is closed in an at least temporary and/or multiply sequential manner, in particular by means of the first spring force, and, as a consequence, is moved into the first closed position, then a resulting, undesired movement of the valve element 18 which is initially situated in the second open position into the second closed position as a result of the self-locking can be avoided. If, for example, the valve element 12 moves into the first closed position as a consequence of its oscillations, with the result that the consumer 4 can then no longer be supplied with the fluid via the valve element 12, the valve element 18 is loaded further with fluid from the flow path 17 via the return line 20 and is therefore still held in the second open position, with the result that, when the valve element 12 is situated at least briefly in the first closed position, the consumer 4 can still be supplied with the fluid via the valve element 18 and the third flow path 17. As a result, a needs-based and reliable supply of the consumer 4 with the fluid can be ensured.

In the following text, possible operation of the supply device 1 is explained: the pump 7 which is, for example, electric conveys the fluid via the first throttle 9 out of the reservoir 2 to the consumer 3. If the pressure of the fluid at the throttle 9 and therefore the first pressure of the fluid at the connecting point V2 rise, for example by virtue of the fact that the electrical current, by means of which the pump 7 is operated, and therefore the volumetric flow of the fluid brought about by way of the pump 7 are increased, the initially closed valve element 12 is activated, that is to say opened. As a consequence, the fluid can flow through the flow path 11 and therefore to the second throttle 15, and the fluid flows to the consumer 4 and at the same time to the consumer 3 in accordance with a hydraulic division brought about by way of the throttles 9 and 15. A pressure of the fluid at or upstream of the throttle 15 in the flow path 11 is activated here downstream of the connecting point V4, or activates the valve element 18. In other words, if a pressure which prevails at the second throttle 15 and therefore the second pressure of the fluid rise in such a way that the second pressure is greater than or equal to the second opening pressure, the initially closed valve element 18 is opened. In the case of an active volumetric flow and a pressure which arises in the process at or upstream of the second throttle 15, in particular downstream of the connecting point V4, the valve element 18 remains open by means of the above-described self-locking action and therefore as a consequence of the hydraulic return brought about by way of the return line 20. If, for example, the electrical current, by means of which the pump 7 is operated, is reduced, with the result that the volumetric flow of the fluid brought about by means of the pump 7 is reduced, the pressure at or upstream of the throttle 9 and therefore the first pressure drop, in particular in such a way that the first valve element 12 closes and, as a consequence, is closed by means of the first spring force. This is the case, in particular, when the volumetric flow of the fluid brought about by way of the pump 7 drops to such an extent that the first pressure drops to such an extent that it is lower than the first opening pressure.

It is preferably provided that the first opening pressure is greater than the second opening pressure. Furthermore, it is preferably provided that the second opening pressure is selected in such a way that a back-pressure can be generated in the case of small and medium volumetric flows by means of the second throttle 15. Efficient operation of the pump 7 is possible as a result. In other words, it is preferably provided that the second opening pressure is selected in such a way that the second opening pressure can be generated or brought about by means of the second throttle 15 in the case of small and medium volumetric flows of the fluid which can be brought about by means of the pump 7.

The respective throttle 9 or 15 preferably has a respective back-pressure. In other words, it is preferably provided that the throttle 9 has a first back-pressure and the throttle 15 has a second back-pressure. Here, the respective back-pressure counteracts the fluid which flows through the respective flow path 6 or 11. It is preferably provided here that the second back-pressure of the second throttle 15 is smaller than the first back-pressure of the first throttle 9, in particular in the case of the same or identical volumetric flow of the fluid through the respective throttle 15 or 9. This can be realized, in particular, by virtue of the fact that the second flow cross section of the throttle 15 which can be flowed through by the fluid is greater than the first flow cross section of the throttle 9 which can be flowed through by the fluid. In particular, the respective flow cross section of the throttle 9 or 15 which can be flowed through by the fluid is to be understood to mean the smallest or the lowest flow cross section of the respective throttle 9 or 15 which can be flowed through by the fluid.

By way of structural design of the second opening pressure, it is possible to define the minimum necessary volumetric flow of the fluid at the pump 7, above which the second valve element 18 closes again. In other words, by way of structural design of the second opening pressure of the second valve element 18, the minimum necessary volumetric flow of the fluid which is to be brought about or set by means of the pump 7 and is also called a closing volumetric flow can be defined, the valve element 18 closing above the closing volumetric flow. In order, for example, to close the initially open, second valve element 18, the pump 7 is operated, in particular regulated, for example, in such a way that the volumetric flow of the fluid is at least briefly lower than or equal to the closing volumetric flow. In other words, the pump 7 is operated, in particular regulated, for example, in such a way that the pressure is at least briefly lower than the second opening pressure, in order to bring it about that the initially open valve element 18 is closed by means of the second spring force. The pump 7 is preferably designed in such a way that it can generate a volumetric flow such that, in the case of an open valve element 12 in interaction with the respective flow cross sections (also called throttle cross sections) of the throttles 9 and 15, the initially closed, second valve element 18 is opened. Overall, it is therefore possible that the consumer 4 can be switched on and switched off as required, with the result that, for example in a first operating state of the pump 7 or by way of a first operating state of the pump 7, in relation to the consumers 3 and 4, exclusively the consumer 3 is supplied with the fluid by means of the pump 7, since, in the first operating state, the valve element 12 and preferably also the valve element 18 are closed, in particular, at the same time. In a second operating state of the pump 7 or by way of a second operating state of the pump 7, the two consumers 3 and 4 are supplied with the fluid by means of the pump 7 at the same time, since, for example in the second operating state, the valve elements 12 and 18 are open at the same time. It can be seen that a change or switchover can be carried out between the open positions and the closed positions of the valve elements 12 and 18 and therefore between the operating states simply by way of varying of the volumetric flow of the fluid, without the valve elements 12 and 18 being actuated actively or electrically. As described above, the connecting point of the fluid can be varied by means of the pump 7 and, in particular, by virtue of the fact that the electrical current, by means of which the pump 7 is operated, is varied. It goes without saying that it would be conceivable that the pump 7 can be operated mechanically, with the result that, for example, the spring element can be driven mechanically. Generally speaking, the volumetric flow of the fluid can be varied by means of the pump 7, in particular, by virtue of the fact that a speed, at which the spring element is moved, and/or a rotational speed, at which the spring element is rotated, are/is varied.

LIST OF DESIGNATIONS

1 Supply device
2 Reservoir
3 First consumer
4 Second consumer
5 Arrow
6 First flow path
7 Pump
8 Arrow
9 First throttle
10 Arrow
11 Second flow path
12 First valve element
13 Control line
14 First spring element
15 Second throttle
16 Arrow
17 Third flow path
18 Second valve element
19 Second spring element
20 Return line
V1 First connecting point
V2 Second connecting point
V3 Third connecting point
V4 Fourth connecting point

The invention claimed is:

1. A supply line for an apparatus, comprising:
   a first flow path through which a fluid is flowable;
   at least one first consumer which is arranged in the first flow path and is supplied via the first flow path with the fluid which flows through the first flow path;
   a pump which is arranged in the first flow path and by which the fluid is conveyed out of a reservoir through the first flow path;
   a throttle which is arranged in the first flow path upstream of the first consumer and downstream of the pump;
   a second flow path through which the fluid is flowable, the second flow path being connected fluidically to the first flow path at a first connecting point which is arranged in the first flow path upstream of the throttle and downstream of the pump;
   at least one second consumer which is arranged in the second flow path and is supplied via the second flow path with the fluid which flows through the second flow path;
   a valve which is arranged in the second flow path downstream of the first connecting point and upstream of the second consumer, the valve being movable between a closed position which shuts the second flow path and an open position which releases the second flow path; and
   a control line which is connected fluidically to the first flow path at a second connecting point which is arranged in the first flow path upstream of the throttle and downstream of the first connecting point, via which control line the valve is loadable with the fluid from the first flow path and, as a result, is movable out of the closed position into the open position, in which the fluid is conveyed by the pump out of the reservoir at the same time through the first flow path and through the second flow path.

2. The supply device according to claim 1, wherein a second throttle is arranged in the second flow path upstream of the second consumer and downstream of the valve.

3. The supply device according to claim 2, further comprising:
   a third flow path through which the fluid is flowable, the third flow path being connected fluidically to the first flow path and/or the second flow path at a third connecting point which is arranged in the first flow path downstream of the pump and/or in the second flow path upstream of the valve element, and being connected fluidically to the second flow path at a fourth connecting point which is arranged in the second flow path downstream of the valve element and upstream of the second consumer.

4. The supply device according to claim 3, wherein the fourth connecting point is arranged in the second flow path upstream of the second throttle.

5. The supply device according to claim 3, further comprising:
   a second valve arranged in the third flow path downstream of the third connecting point and upstream of the fourth connecting point, which second valve is movable between a second closed position which shuts the third flow path and a second open position which releases the third flow path and in which the fluid is conveyed by the pump out of the reservoir through the third flow path.

6. The supply device according to claim 5, further comprising:
   a return line, via which the second valve element is:
   (i) loadable with the fluid from the second flow path by a return point which is arranged in the second flow path downstream of the first valve element and upstream of the second consumer, and movable as a result out of the second closed position into the second open position, and
   (ii) loadable with at least part of the fluid from the third flow path and held in the second open position as a result.

7. The supply device according to claim 6, wherein the return line is connected at the fourth connecting point as the return point fluidically to the second flow path and fluidically to the third flow path.

8. An apparatus comprising at least one supply device according to claim 1.

9. The apparatus according to claim 8, wherein the apparatus is a transmission or an electric machine.

10. A motor vehicle comprising at least one apparatus according to claim 8.

11. A motor vehicle comprising at least one apparatus according to claim 9.

* * * * *